United States Patent [19]

Salvatore

[11] Patent Number: 4,467,985
[45] Date of Patent: Aug. 28, 1984

[54] VORTEX INHIBITING CLOSED SPHERICAL OUTLET STRUCTURE

[75] Inventor: Jeremiah O. Salvatore, Redondo Beach, Calif.

[73] Assignee: Hughes Aircraft Company, El Segundo, Calif.

[21] Appl. No.: 426,467

[22] Filed: Sep. 29, 1982

Related U.S. Application Data

[63] Continuation of Ser. No. 200,678, Oct. 27, 1980, abandoned.

[51] Int. Cl.³ .............................................. B64G 1/66
[52] U.S. Cl. ............................ 244/135 R; 244/158 R; 137/590
[58] Field of Search ................... 244/135 R, 158, 159, 244/165; 137/590, 585; 141/339, 286; 222/575, 566; 220/DIG. 6; 4/195, 650

[56] References Cited

U.S. PATENT DOCUMENTS 2,884,937  5/1959  Myers, Jr. ........................... 137/590
2,920,648  1/1960  Sheffer ................................ 137/590
3,072,140  1/1963  Kmiecik et al. ................... 137/596
3,202,160  8/1965  Barger ................................. 137/590

FOREIGN PATENT DOCUMENTS 0042784 12/1981 European Pat. Off. .............. 135 R/
659390   6/1929  France ................................... 4/650
587462   1/1959  Italy ....................................... 4/650

OTHER PUBLICATIONS

Nothwang, "Pioneer Venus Spacecraft Design and Operation", IEEE Trans. on Geoscience and Remote Series, vol. 6E18, No. 1, 1/80.
Hughes, "Preliminary Design Review Data Package", 2 pp. 2–446-2–449, 2–468, 2–469, Mar. 5, 1979, (LEA-SAT).

*Primary Examiner*—Galen L. Barefoot
*Attorney, Agent, or Firm*—Allen A. Dicke, Jr.; Gerald J. Woloson; A. W. Karambelas

[57] ABSTRACT

Spherical tank 30 has its outlet 34 angularly positioned away from the tank center line axis 54 which is parallel to the local gravity vector 26. This angular positioning of outlet 34 inhibits vortexing as liquid is withdrawn from tank 30.

4 Claims, 4 Drawing Figures

VORTEX INHIBITING CLOSED SPHERICAL OUTLET STRUCTURE

This a continuation of application Ser. No. 200,678 filed Oct. 27, 1980, now abandoned.

BACKGROUND OF THE INVENTION

This invention is directed to a vortex inhibiting spherical tank outlet structure wherein the closed tank outlet is positioned away from the local gravity vector in the tank.

When the tank is used to supply liquid, the ingestion of vapor from over the liquid into the liquid outlet line may cause serious problems. In one case, where the tank is pressurized with an inert gas and liquid fuel is supplied from the tank outlet, the ingestion of pressurizing gas into the outlet line is serious and may cause flame-out where the fuel is burned, leading to overheating, chugging and possibly explosion.

Prior efforts led to the conclusion that antivortexing baffles were the best solution to the problem, and these were universally adopted. However, different problems occur in zero and low gravity force operations.

In spinning spacecraft, it can be argued that a coriolis type moment is produced by an interaction of fluid motion moving radially inward towards the drain, combined with the angular-spin rate. This moment could be the driver in the vortexing, but this is difficult to qualify. Other possibilities of swirl initiation are angular rates left over from satellite orientation and random inputs caused by orientation correction pulses. These possibilities become particularly apparent in spacecraft structures where the local gravity force is either zero or much smaller than earth gravity, but the same concepts apply to earth-bound tanks. Such earth-bound tanks is a 1 G environment can also benefit from the invention defined herein. Accordingly, there is a need for a means for inhibiting vortexing at the outlet of a tank structure.

SUMMARY

In order to aid in the understanding of this invention, it can be stated in essentially summary form that it is directed to a vortex inhibiting tank outlet structure wherein the tank outlet is angularly oriented with respect to the local gravity vector.

It is thus a purpose of this invention to provide a structure which inhibits vortexing at a tank outlet. It is another object to provide a tank outlet which is angularly oriented away from the local gravity vector within a tank so that the outlet is not at the "bottom" of the tank and is also angularly positioned with respect to the vector.

It is another purpose to provide a vortex inhibiting tank outlet structure which can be employed without taking up tank volume, or get in the way of internal tank structures or internal tank flows.

Other purposes and advantages of this invention will become apparent from a study of the following portion of this specification, the claims and the attached drawings.

DESCRIPTION OF THE PREFERRED EMBODIMENT

Figure 1:
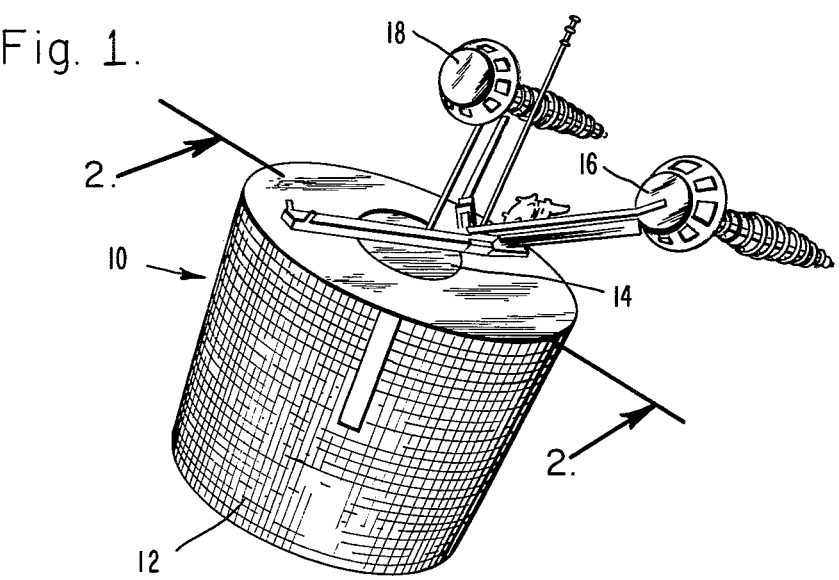
FIG. 1 is a perspective view of the satellite in space where the vortex inhibiting tank outlet structure of this invention may be employed.
Figure 2:
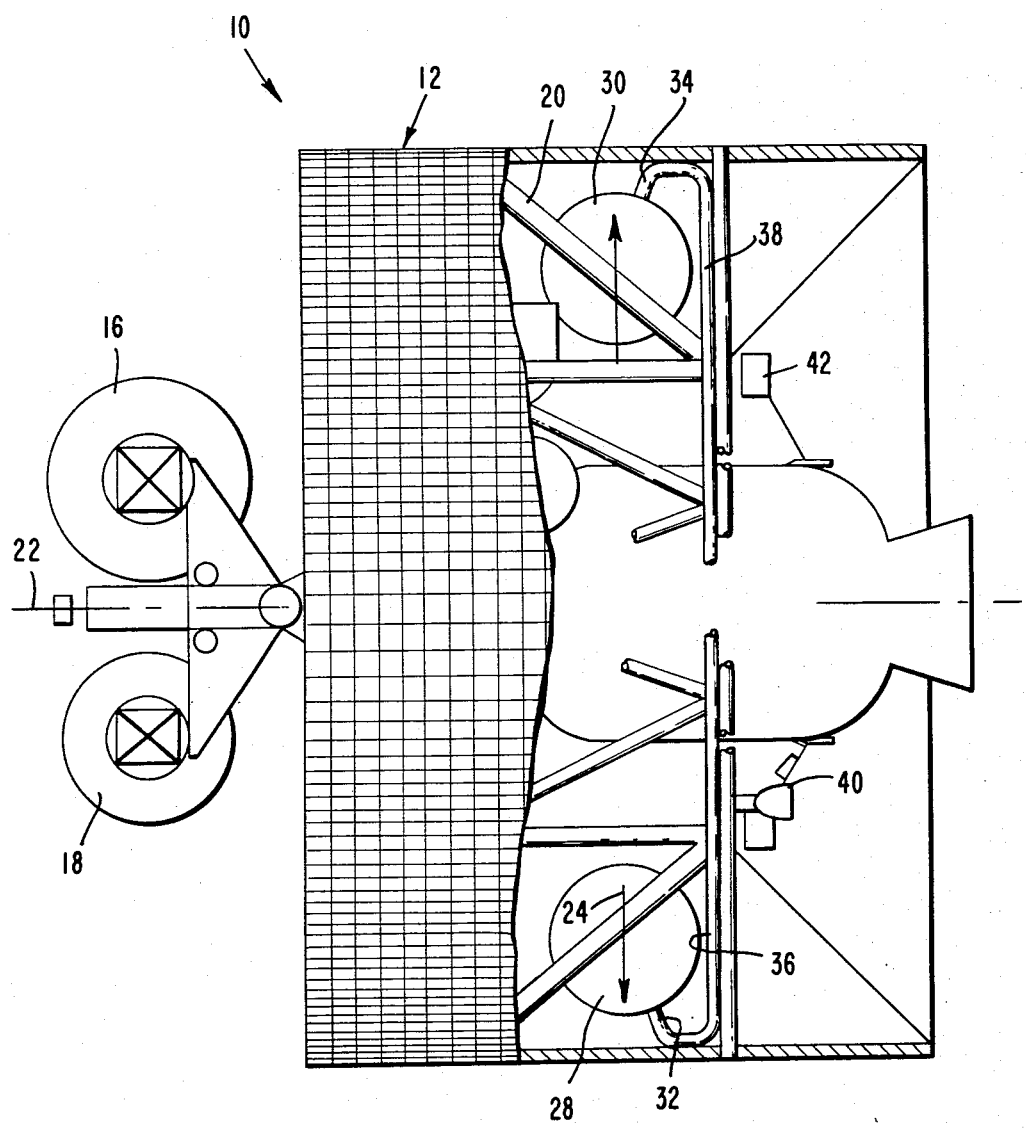
FIG. 2 is a section taken generally along line II—II of the satellite of FIG. 1, but showing the satellite antennas in the stowed position, with parts of the satellite structure broken away.

Satellite 10 shown in FIGS. 1 and 2 has a cylindrical spinning body 12 which is illustrated as being covered with solar cells to supply the electric power requirements of the satellite electrical systems. The despun platform 14, see FIG. 1, is rotatively mounted with respect to the spinning body 12 and rotates with respect thereto so that antennas 16 and 18 mounted thereon can be directed as desired. Quite often the antennas are directed toward earth. In FIG. 2, the antennas 16 and 18 are shown in the stowed position, for economy of drawing. Spinning body 12 has an interior frame 20 on which the various parts are mounted. The spinning body 12 rotates on axis 22 to produce a radially outward accerational force from that axis. Vectors 24 and 26 represent the radially outward local G force, which usually is a small fraction of the earth's gravity acceleration.

Tanks 28 and 30 are spherical propellant tanks formed of a structural shell which constrains the internal tank pressure and defines the tank as a vessel which has a volume. The tanks respectively supply liquid propellant out of outlets 32 and 34 to propellant lines 36 and 38. The lines are connected through suitable control valves to thrusters which are oriented in various directions to be used for attitude control and station keeping. Thrusters 40 and 42 are illustrated and there are usually sufficient thrusters to control attitude on three axes. Sometimes, station keeping thrusters are also supplied from the same fuel propellant system. The propellant may comprise two liquids in a bipropellant system or the single liquid is a monopropellant system.

Figure 4:
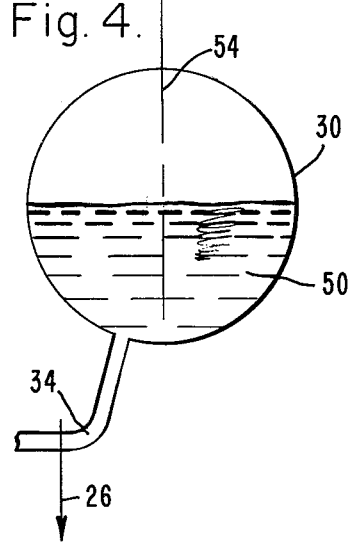
FIG. 4 is a center line section through the tank of this invention, showing its outlet away from the local gravity vector.

Since there is a local gravity vector resulting from the spinning of body 12, no bladder or other mechanical expulsion device is necessary for the expulsion of fluid from the tanks. In FIG. 4, the local gravity vector is indicated at 26.

Figure 3:
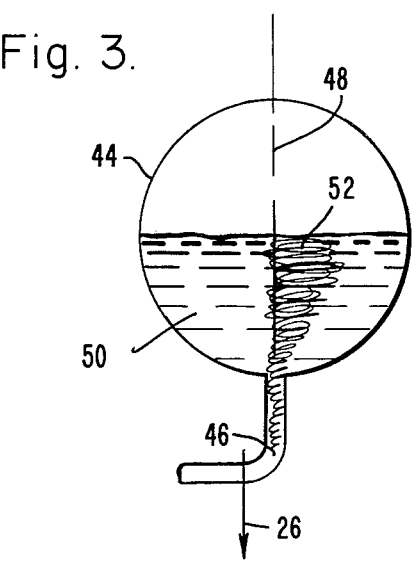
FIG. 3 is a center line section through a tank and its outlet in accordance with the prior art.

In the prior art tank 44 illustrated in FIG. 3, the tank outlet 46 was on a central axis 48 through the tank which was parallel to the local gravity vector 26. In other words, outlet 46 was at the bottom of the tank, directly on the tank axis. In view of this gravity vector, withdrawal of the propellant liquid 50 from the tank caused a vortex 52 to form. In view of the very low acceleration along the vector 26, even when there is a substantial amount of liquid 50 in the tank 44, due to the vortex, pressurization gas or vapor over the liquid may be discharged out of the outlet 46.

This invention overcomes the vortexing problem. The tank 30 of this invention is illustrated in FIGS. 2 and 4, and it has an outlet 34 which is positioned away from the center line axis 54 of tank 30 which is parallel to the local gravity vector 26. While it has been shown that angular positioning of outlet 34 away from axis 54 from 1° upward is operative, an angle of 10° between the axis 54 and outlet 34 as considered preferable. This angle is small enough that little unused liquid is left in the bottom of tank 30, but the angle is larger than the minimum 1° angle required to inhibit vortexing.

As illustrated in FIG. 4, the tank 30 is formed of a spherical shell and axis 54 passes through the geometric axis of the spherical shell. Axis 54 is parallel to the local gravity vector 26. Outlet 34 is secured to the tank shell and forms the tank outlet structure, which is part of the tank in accordance with this invention. As indicated in FIG. 4, outlet tube 34 is away from axis 54. It has been found that so much as a 1° separation of the outlet 34 from the axis 54 has a substantial effect on vortex inhibition. However, for mechanical safety, the outlet 34 is positioned from 5° to 10° away from axis 54. Thus, the angle of effectiveness is as little as 1°, and when the angle gets up into the region of 15° the amount of liquid left in the spherical tank below the outlet becomes excessive. Therefore, a more limited and more preferred range of angularity of the tank outlet structure is from 5° to 10°.

There are a plurality of mechanisms which provide some propellant angular momentum around the tank center line radial vector 54 which is normal to the spin axis. The most likely generating functions are motion amplification due to boundary layer interactions associated with curved streamlines, and irrotational inphase sloshing, driven by spin axis nutation, turning into reversing-periodically-rotational flow. In addition, there is a coriolis type moment produced by an interaction of fluid moving radially outward towards the drain combined with the spin angular rate. Other causal possibilities of swirl initiation are angular rates left over from the orientation maneuvers, and random inputs caused by a series of station keeping pulses. These factors are not well understood, and as a result it becomes impossible to eliminate the vortexing by eliminating the causes.

The present tanks are spherical, principally for their favorable weight versus volume and pressure handling ratios, but the considerations also apply to any tank which is a section of revolution around an axis which extends in the gravity vector direction. Baffles can be used, but they cause a pressure drop and add weight to the structure. However, the positioning of the tank outlet away from its center line on the gravity vector is equally capable of inhibiting vortexing in tanks which are non-spherical tanks which are not surfaces of revolution and tanks where the outlet is not on the center line. As expected, higher flow rates produce stronger vortexing. However, the vortexing phenomena was found to be independent of fraction of tank fill, direction of initial fluid rotation, tank pressure variations and kinematic viscosity of the liquid. Decreases in outlet tube diameter cause stronger vortexing due to increased flow velocity.

Thus, improved vortex inhibition is needed where the vapor or pressurizing gas over the liquid in the tank should not be delivered from the tank outlet at least until the tank is empty of liquid.

This invention has been described in its presently contemplated best mode and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A closed spherical tank for mounting in a spin-stabilized spacecraft for the storage and discharge of propellant liquid in a space environment having a gravity vector due to the spinning of the spacecraft, said tank comprising:
    a closed spherical tank shell having a center point and enclosing an unobstructed spherical tank interior volume for the containment of propellant liquid, said tank having an axis through the center of said tank and in line with the local gravity vector caused by the spinning of the spacecraft, the improvement comprising:
    said closed spherical tank of unobstructed interior having an outlet comprising an opening in said closed spherical shell and an outlet tube connected to said opening and extending out of said opening and not into said shell to provide a completely open unobstructed interior in said shell, said outlet tube being for discharging propellant liquid from said closed spherical shell of said tank;
    said outlet being between 1° and 15° angularly away from said spherical tank center line axis in line with the local gravity vector caused by spinning of the spacecraft to inhibit vortexing in propellant liquid being discharged from said spherical tank out of said outlet.

2. The tank of claim 1 wherein said outlet is between 5° and 10° away from said axis.

3. A closed spherical tank for mounting on a spin-stabilized spacecraft for containing propellant liquid and for use where the local gravity vector is caused by stabilizing spin of the spacecraft, said spherical tank comprising:
    a closed shell enclosing the spherical tank volume in which propellant liquid is to be stored, said shell being spherical and having a center and having an axis passing through the center of said tank and directed parallel to the local gravity vector, the improvement comprising:
    said closed spherical tank having a completely unobstructed interior, an outlet in said shell and an outlet tube fastened to extend away from said outlet from said spherical shell for discharging propellant liquid from the unobstructed interior of said spherical shell, said outlet tube not extending into said shell to provide a completely open shell interior; and
    said outlet from said spherical shell being positioned between 5° and 10° away from said axis.

4. In a system for delivery of liquid fuel to a combustor for use on a spin-stabilized satellite wherein a closed fuel tank has a gravitational axis caused by satellite spin, a spherical surface of revolution about such axis, a completely unobstructed tank interior and an outlet for propellant liquid fuel flowing from said tank, a method for inhibiting the ingestion, into the propellant liquid fuel withdrawn through said outlet, of gas from an axial vortex within said closed tank, the method comprising the steps of positioning said outlet away from said gravitational axis at the lower end thereof by 1°–15° and then withdrawing said propellant liquid fuel from said positioned outlet.

* * * * *